(12) United States Patent
Balasubramanian

(10) Patent No.: US 8,943,468 B2
(45) Date of Patent: Jan. 27, 2015

(54) WIREFRAME RECOGNITION AND ANALYSIS ENGINE

(75) Inventor: Kamesh Sivaraman Balasubramanian, Pasadena, CA (US)

(73) Assignee: Kamesh Sivaraman Balasubramanian, Pasadena, CA (US)

( * ) Notice: Subject to any disclaimer, the term of this patent is extended or adjusted under 35 U.S.C. 154(b) by 400 days.

(21) Appl. No.: 13/597,329

(22) Filed: Aug. 29, 2012

(65) Prior Publication Data

US 2014/0068553 A1    Mar. 6, 2014

(51) Int. Cl.
*G06F 9/44* (2006.01)

(52) U.S. Cl.
USPC .......................................................... 717/109

(58) Field of Classification Search
None
See application file for complete search history.

(56) References Cited

U.S. PATENT DOCUMENTS

| | | | |
|---|---|---|---|
| 7,886,222 B2 | 2/2011 | Bagare et al. | |
| 7,937,665 B1 | 5/2011 | Vazquez et al. | |
| 7,987,448 B2 | 7/2011 | Kodosky et al. | |
| 8,214,805 B2 | 7/2012 | Stewart | |
| 8,219,969 B2 * | 7/2012 | Motoyama et al. | 717/106 |
| 8,438,495 B1 * | 5/2013 | Gilra et al. | 715/781 |
| 2006/0008151 A1 * | 1/2006 | Lin et al. | 382/190 |
| 2009/0273597 A1 | 11/2009 | Chatamballi et al. | |
| 2011/0145783 A1 * | 6/2011 | Seshan et al. | 717/105 |

OTHER PUBLICATIONS

Meyer, Disposable Sketch Based Interfaces, ACM CHI '96, Apr. 13, 1996, pp. 195-196, ACM, NY.
Lin, A visual language for a sketch-based UI prototyping tool, CHI EA '99, May 1999, pp. 298-299, ACM, NY.
Landay et al., Sketching Interfaces: Toward More Human Interface Design, Journal Computer, Mar. 2001, pp. 56-64 vol. 34 Issue 3, IEEE Computer Society Press, Los Alamitos, CA.
Caetano et al., JavaSketchIt: Issues in Sketching the Look of User Interfaces, 2002, Proc. of the 2002 AAAI Spring Symposium, USA.
Alvarado et al., SketchRead: A Multi-Domain Sketch Recognition Engine, UIST '04, Oct. 24, 2004, pp. 23-32, ACM, NY.
Huot et al., The MaggLite post-WIMP toolkit: draw it, connect it and run it, UIST '04, 2004, pp. 257-266, ACM NY.
Plimmer et al., A toolkit approach to sketched diagram recognition, BCS-HCI '07, 2007, pp. 205-213, BCS, Swinton, UK.
Schmieder et al., Cross-Domain Diagram Sketch Recognition, VL/HCC Workshop, Sep. 15, 2008, pp. 64-73, Herrsching am Ammersee, Germany.
Kieffer et al., User interface design by sketching: a complexity analysis of widget representations, EICS '10, Jun. 19, 2010, pp. 57-66, ACM, NY.

* cited by examiner

*Primary Examiner* — Lewis A Bullock, Jr.
*Assistant Examiner* — Mark Gooray

(57) ABSTRACT

A method and system for dynamically producing source code for a software application from a set of wireframe images is presented herein. A wireframe recognition and analysis engine receives a set of wireframe images from an end user's device over a network. The features that comprise each wireframe in the set of wireframe images are identified by comparing against a library of models, and saved to a data store. An inference engine, driven by a knowledge base of wireframe design rules, processes the contents of the data store to formulate a collection of wireframe components. A template engine dynamically produces source code for the software application using the collection of wireframe components and a set of source templates. All produced source code are compressed into a single archive file and provided to the end user's device to download.

8 Claims, 12 Drawing Sheets

```php
#!/usr/bin/php
<?
require_once('include/DropDownMenu.php');

if (count($argv) != 2)
{
    echo "Usage: DropDownMenuTemplate <serialized wireframe component object file>\n";
    exit;
} if (!file_exists($argv[1]))
{
    exit("ERROR: Failed to find the serialized wireframe component object file!\n");
}

$wireframe_component = unserialize(file_get_contents($argv[1]));
if (!$wireframe_component)
{
    exit("ERROR: Failed to deserialize wireframe component object file's contents!\n");
}

$keys = $wireframe_component->keyList;
$x_pos = number_format($wireframe_component->xCoordinate, 1) . "f";
$y_pos = number_format($wireframe_component->yCoordinate, 1) . "f";
$width = $wireframe_component->width;
$height = $wireframe_component->height;
$default_value = $wireframe_component->defaultValue;

$code_buffer = "";
$code_buffer .= "NSArray *keys = [[NSArray alloc] initWithObjects:";

for ($i=0; $i<count($keys); $i++)
{
    $code_buffer .= '@"' . $keys[$i] . '", ';
}
$code_buffer .= 'nil];' . "\n";

$code_buffer .= "NSPopUpButton *myPopButton = [[NSPopUpButton alloc] init];\n";
$code_buffer .= "[myPopButton setFrame:NSMakeRect($x_pos,$y_pos,$width,$height)];\n";
$code_buffer .= "[myPopButton setFrameOrigin:CGPointMake(" . $x_pos . ", " . $y_pos . ")];\n";

$code_buffer .= <<<code_out
for (int i=0; i < [keys count]; i++)
{
    [myPopButton insertItemWithTitle:[keys objectAtIndex:i] atIndex:i];
}\n
code_out;

if ($default_value)
{
    $code_buffer .= "[myPopButton selectItemWithTitle:@\"$default_value\"];\n";
}

$code_buffer .= '[self.window.contentView addSubview:myPopButton];' . "\n";
echo $code_buffer;

class WireframeComponent
{
    public $componentID;
    public $status;
    public $type;
    public $sheetNumber;
    public $xCoordinate;
    public $yCoordinate;
    public $width;
    public $height;

public function __construct()
    {
    }
}

require_once("WireframeComponent.php");

class DropDownMenu extends WireframeComponent
{
    public $defaultValue;
    public $keyList;

public function __construct()
    {
    }
}

```
O:12:"DropDownMenu":10:{s:12:"defaultValue";s:14:"Select a color";s:7:"keyList";a:6:{i:0;s:14:"Select
a color";i:1;s:4:"Blue";i:2;s:5:"Green";i:3;s:6:"Orange";i:4;s:3:"Red";i:5;s:6:"Yellow";}s:
11:"componentID";s:1:"1";s:6:"status";s:9:"processed";s:4:"type";s:14:"user interface";s:
11:"sheetNumber";s:1:"1";s:11:"xCoordinate";s:3:"108";s:11:"yCoordinate";s:3:"108";s:5:"width";s:
3:"200";s:6:"height";s:3:"100";}
```

FIG. 9C

```
NSArray *keys = [[NSArray alloc] initWithObjects:@"Select a color", @"Blue", @"Green", @"Orange",
@"Red", @"Yellow", nil];
NSPopUpButton *myPopButton = [[NSPopUpButton alloc] init];
[myPopButton setFrame:NSMakeRect(108.0f,108.0f,200,100)];
[myPopButton setFrameOrigin:CGPointMake(108.0f, 108.0f)];
for (int i=0; i < [keys count]; i++)
{
    [myPopButton insertItemWithTitle:[keys objectAtIndex:i] atIndex:i];
}
[myPopButton selectItemWithTitle:@"Select a color"];
[self.window.contentView addSubview:myPopButton];
```

FIG. 10

Text Label Rule

Conditions:

1. A text feature object, designated as TF1, is immediately contained within a rectangle shape feature object designated as R1.
2. R1 has the second largest width in the wireframe image.
3. R1 is contained within a rectangle shape feature object designated as R2.
4. R2 has the largest width in the wireframe image.

Actions:

1. Instantiate a text label wireframe component object of type "user interface" designated as TL1.
2. Set TL1's text value property to the text value property assigned to TF1.
3. Set TL1's screen coordinate properties to the screen coordinate properties assigned to TF1.
4. Set TL1's width and height properties to the width and height properties assigned to TF1.
5. Save TL1 to the data store.

Drop Down Menu Rule

Conditions:

1. A triangle shape feature object, designated as T1, is contained within a rectangle shape feature object designated as R1
2. R1 is contained within a rectangle shape feature object designated as R2
3. R2's width is at least 7 times greater than that of R1
4. R1's x-coordinate is at least 1.5 times greater than R2's x-coordinate
5. A text feature object, designated as TF1, is contained within R2
6. R2 is contained within a rectangle shape feature object designated as R3.
7. R3 has the second largest width in the wireframe image.
8. R3 is contained within a rectangle shape feature object designated as R4.
9. R4 has the largest width in the wireframe image.

Actions:

1. Instantiate a drop down menu wireframe component object designated as DDM1.
2. Set DDM1's width and height properties to the width and height properties assigned to R2.
3. Set DDM1's screen coordinate properties to the screen coordinate properties assigned to R2.
4. Set DDM1's default value property to the text value property assigned to TF1.
5. Save DDM1 to the data store.

FIG. 11B

Wireframe Annotation Marker Rule

Conditions:
1. A text feature object, designated as TF1, is contained within a circle shape feature object designated as C1
2. C1 is contained within a rectangle shape feature object designated as R1
3. R1 has the second largest width in the wireframe image.
4. R1 is contained within a rectangle shape feature object designated as R2.
5. R2 has the largest width in the wireframe image.

Actions:
1. Instantiate a wireframe annotation marker wireframe component object designated as WAM1.
2. Set WAM1's width and height properties to the width and height properties assigned to C1.
3. Set WAM1's screen coordinate properties to the screen coordinate properties assigned to C1.
4. Set WAM1's annotation index property to the text value property assigned to TF1.
5. Save WAM1 to the data store.

FIG. 12A

Wireframe Annotation Rule

Conditions:
1. A text feature object, designated as TF1, is contained within a rectangle shape feature object designated as R1.
2. R1 contains a text feature object, designated as TF2, with a text value property of "Wireframe Annotations".
3. The text value property of TF1 does not equal the string "Wireframe Annotations".

Actions:
1. Parse TF1's text value property and retrieve the annotation reference index.
2. Use the annotation reference index to fetch the relevant wireframe annotation marker object, designated as WAM1, from the data store.
3. Using WAM1's screen coordinates, find the closest wireframe component object, designated as WCO1.
4. Parse TF1's text value property to determine the appropriate handler to apply, along with the input arguments to pass to the handler.
5. Apply the handler on WCO1 with the input arguments.

WIREFRAME RECOGNITION AND ANALYSIS ENGINE

FIELD OF THE INVENTION

The present invention generally relates to the field of software development, and more particularly, relates to a method and system for dynamically producing source code for a software application by means of recognition and analysis of the wireframes depicting the software application.

BACKGROUND OF THE INVENTION

In the design phase of a software development project, user interface (UI) and/or user experience (UX) designers create wireframes depicting the software application that is to be constructed. Wireframes can contain information regarding the layout of the software application's user interface, navigational structure, and available functionality. When the software development project reaches the implementation phase, a software developer is often tasked with implementing the software application based on the set of wireframes that were created in the design phase. Much productivity is lost when the software developer must manually develop source code for those portions of the software application that were depicted in the set of wireframes from scratch. It would be more productive, if the designers could provide source code to the software developer before the implementation phase, but most designers are not trained in software development, and providing the necessary amount of software development training to designers can become an expensive and time-consuming endeavor. Considerable costs in development time and human resources could be saved, if the designer and/or software developer had an autonomous solution to produce the source code of those portions of the software application that were depicted in the set of wireframes before the implementation phase of a software development project. What is needed, is a means to dynamically produce source code for a software application through the recognition and analysis of the wireframes depicting the software application.

SUMMARY OF THE INVENTION

The need above is addressed by the present invention which comprises of a computer-implemented method, a non-transitory computer readable storage medium, and a computer system for dynamically producing source code for a software application from a set of wireframes.

An embodiment of the computer-implemented method comprises defining a plurality of shapes common to wireframe images in a library of models;

defining a plurality of wireframe design rules in a knowledge base;

receiving, from an end user's device, a set of wireframe images depicting the software application to be fabricated and a set of user-configured options;

extracting the plurality of features contained in each wireframe image in the set;

formulating a collection of wireframe components from the plurality of extracted features;

generating the source code for the software application from the collection of wireframe components;

providing to the end user's device, an archive file containing the source code for the software application.

An embodiment of the medium stores executable computer program instructions that constitute a service comprises defining a plurality of shapes common to wireframe images in a library of models;

defining a plurality of wireframe design rules in a knowledge base;

receiving, from an end user's device, a set of wireframe images depicting the software application to be fabricated and a set of user-configured options;

extracting the plurality of features contained in each wireframe image in the set;

formulating the collection of wireframe components from the plurality of extracted features;

generating the source code for the software application from the collection of wireframe components;

providing to the end user's device, an archive file containing the source code for the software application.

An embodiment of the computer system comprises memory;

input/output (I/O) device;

at least one non-transitory computer-readable storage medium storing executable computer program instructions comprising instructions for:

defining a plurality of shapes common to wireframe images in a library of models;

defining a plurality of wireframe design rules in a knowledge base;

receiving, from an end user's device via the input/output (I/O) device, a set of wireframe images depicting the software application to be fabricated and a set of user-configured options;

extracting the plurality of features contained in each wireframe image in the set;

formulating the collection of wireframe components from the plurality of extracted features;

generating the source code for the software application from the collection of wireframe components;

providing to the end user's device, via the input/output (I/O) device, an archive file containing the source code for the software application.

and at least one CPU for executing the computer program instructions.

BRIEF DESCRIPTION OF THE DRAWINGS

FIG. 8 is an example of a source template used to generate source code for a drop down menu, according to one embodiment.

FIG. 9A is an exemplary class declaration for a wireframe component object, according to one embodiment.

FIG. 9B is an exemplary class declaration for a drop down menu wireframe component object, according to one embodiment.

FIG. 9C is an example of a serialized drop down menu wireframe component object, according to one embodiment.

FIG. 10 is exemplary output source code generated by a template engine for a drop down menu, according to one embodiment.

FIG. 11A is an example of a text label rule defined in the knowledge base, according to one embodiment.

FIG. 11B is an example of a drop down menu rule defined in the knowledge base, according to one embodiment.

FIG. 12A is an example of a wireframe annotation marker rule defined in the knowledge base, according to one embodiment.

FIG. 12B is an example of a wireframe annotation rule defined in the knowledge base, according to one embodiment.

DETAILED DESCRIPTION

The Figures (FIGS.) and the following detailed description describe certain embodiments of the present invention by way of illustration only. Those skilled in the art will recognize from the following detailed description that other embodiments may be utilized and that changes may be made without departing from the scope of the present invention. The embodiments of the present invention are described in sufficient detail to enable those skilled in the art to practice the invention.

Figure 1:
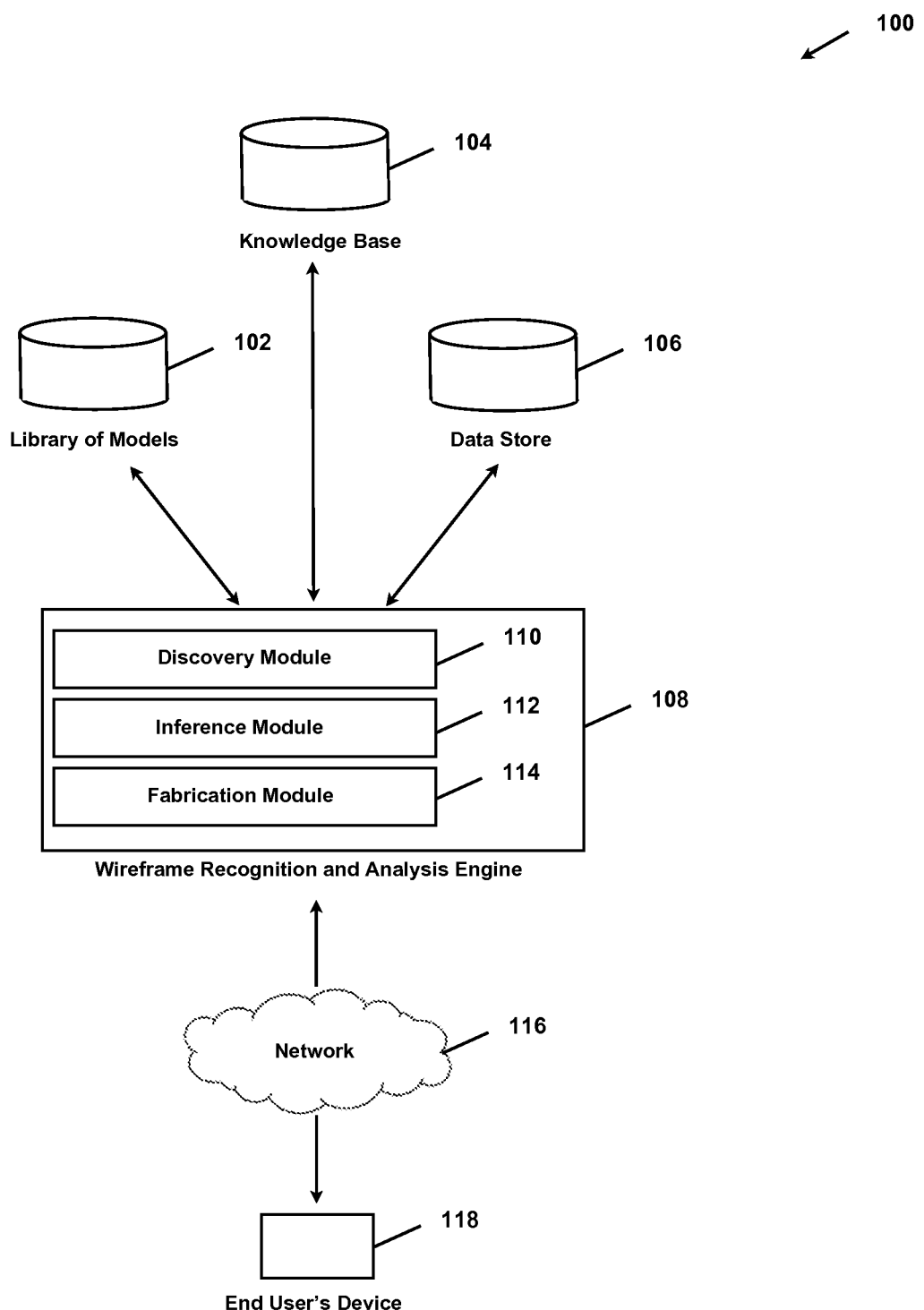
FIG. 1 is a high-level block diagram illustrating a system for dynamically producing source code for a software application from a set of wireframe images, according to one embodiment.

FIG. 1 is a high-level block diagram illustrating a system 100 for dynamically producing source code for a software application from a set of wireframes, according to one embodiment of the present invention. As shown, the system 100 includes the wireframe recognition and analysis engine 108 (WRAE) in communication with an end user's device 118, which could be a smartphone, tablet, or personal computer via a network 116 (e.g., intranet or Internet). In the considered embodiment, the end user's device communicates with the wireframe recognition and analysis engine through a TCP/IP connection over the network 116. Hereinafter, the wireframe recognition and analysis engine 108 is referred to as the WRAE. The WRAE 108 is coupled to a library of models 102, a knowledge base 104, and a data store 106. In the considered embodiment, the library of models 102, the knowledge base 104, and the data store 106 are flat-file databases.

A wireframe image can be created by scanning a sheet of paper containing a wireframe with a desktop (or flatbed) scanner, taking a photo of a wireframe with a camera or mobile device (e.g., smartphone or tablet), or using a computer aided design tool to draw a wireframe and save the wireframe as an image file. The input, a set of wireframe images depicting the software application to be fabricated, is sent via the network 116 from an end user's device 118 to the WRAE 108 for processing. A set of user configurable parameters is transmitted along with the input set of wireframe images. These parameters include, a parameter to select the target platform of the software application. As used herein, the term "target platform" refers to the device and operating system (including the operating system's major release version) that the finished software application is expected to run on. In addition, a parameter exists to specify the user's e-mail address, which will be used to alert the user when the source code for the software application has been generated.

Once the WRAE server has successfully retrieved the input set of wireframe images, it assigns a unique alphanumeric identifier known as a "job id" for the current user session. The WRAE daemon process persists in memory the user configurable parameters that were sent alongside the wireframe images using a hash map data structure with the job id serving as the key. This information may also be persisted to the hard disk. A "jobs" directory is designated on the WRAE server to store all user session data. For example, the WRAE server may store all jobs at the following path:/wrae_jobs. A user session that has been assigned a job id of "bm93jzrfn", would have a directory dynamically created at the following path:/wrae_jobs/bm93jzrfn. An "assets" directory for the job is dynamically created as a subdirectory whose parent directory is the current job id. The uploaded wireframe image files are moved over to the assets directory. For example, for job id "bm93jzrfn", the following assets directory will be created on the WRAE server:/wrae_jobs/bm93jzrfn/assets. An additional directory is created to serve as the data store 106, where the data store 106 is unique to a user session and applies only to the input set of wireframes for a particular job id. This directory will be named "data_store" and will exist as a subdirectory of the directory named with the current job id. For example, for job id "bm93jzrfn", the following data store 106 directory will be created on the WRAE server:/wrae_jobs/bm93jzrfn/data_store. A "source code output" directory for the job is dynamically created as a subdirectory whose parent directory is the current job id. All source code produced by the WRAE system for the current job id is stored at this location. For example, for job id "bm93jzrfn", the following output source code directory will be created on the WRAE server:/wrae_jobs/bm93jzrfn/output_source_code.

As used herein, the term "module" refers to computer program instructions and/or other logic used to provide the specified functionality. A module can be implemented in software, hardware, and/or firmware. The WRAE 108 consists of a discovery module 110 for performing feature extraction on each wireframe contained in the set of wireframes, an inference module 112 for formulating the collection of wireframe components, and a fabrication module 114 for dynamically producing the source code for the software application. As used herein, the term "features" refers to shapes and text contained in a wireframe.

Features are represented in the WRAE as objects. A base feature object defines properties shared across all features, such as the feature's screen coordinates. A shape feature object extends the base feature object and may provide additional properties such as the type of shape the feature depicts. A variety of shapes, such as a rectangle, triangle, circle, etc. can be implemented as subclasses of the base shape object. These individual shape feature objects would have properties that were custom to the type of shape they represent. A text object extends the base feature object and has a text value property which stores the value of the text string for the text feature it represents. All feature objects have a rectangle bounding box property, which represents a bounding box rectangle that bounds the feature.

Figure 7:
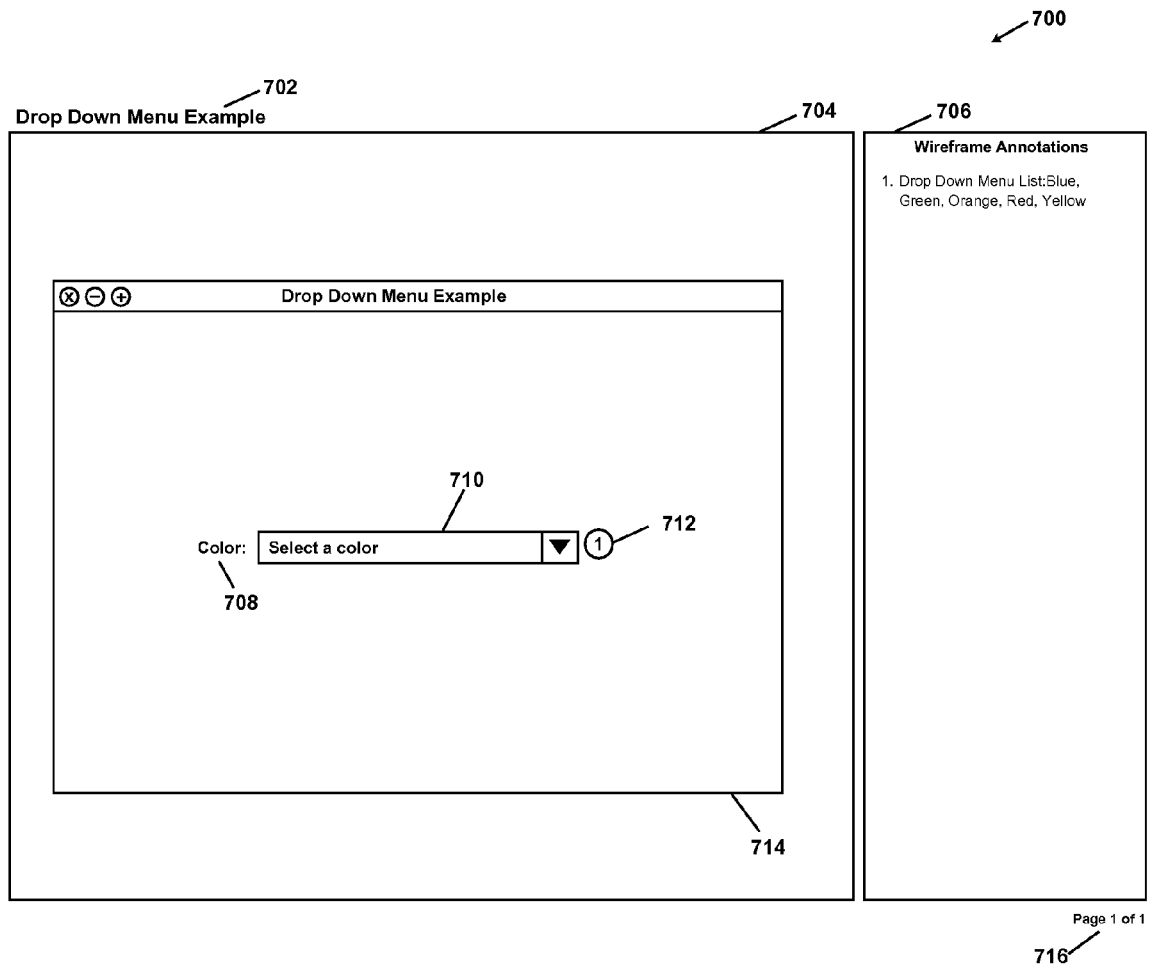
FIG. 7 is an illustration of a wireframe depicting a software application, according to one embodiment.

FIG. 7 is an illustration of a wireframe depicting a software application. For illustrative purposes, FIG. 7 comprises a wireframe set used as input to the WRAE. As used herein, the term "wireframe component" refers to an element contained in a wireframe. Wireframe components can be classified into two distinct types. The first type, a user interface wireframe component, depicts a user interface element (e.g., text field, drop down menu, button) which will be represented in the finished software application's graphical user interface. The second type, a structural wireframe component, depicts an element that is specific to the wireframe's structure (e.g., the title of the wireframe, the page number of the wireframe, wireframe annotation markers). Structural wireframe components are not displayed in the finished software application. For example, the wireframe components depicted in illustration 700 include the following user interface wireframe components: application window frame 714, text label 708, and drop down menu field 710. The following structural wireframe components are depicted in illustration 700: the title of the wireframe 702, user interface container 704, wireframe annotations container 706, a wireframe annotation marker 712, and the page number of the wireframe 716.

Similar to features, wireframe components are also represented in the WRAE as objects. A base wireframe component object defines properties shared across all wireframe components such as the wireframe component's screen coordinates. A wireframe component object can have a type property specifying if the wireframe is of type user interface or structural. A variety of wireframe component objects, such as a drop down menu, text label, button, etc. can be implemented as a subclass of the base wireframe component object. For example, a wireframe component object representing a drop down menu can have the following properties: width, height, key list (a list of items displayed in the drop down menu's list), and default key (the item that should be displayed by default in the drop down menu).

Figure 2:
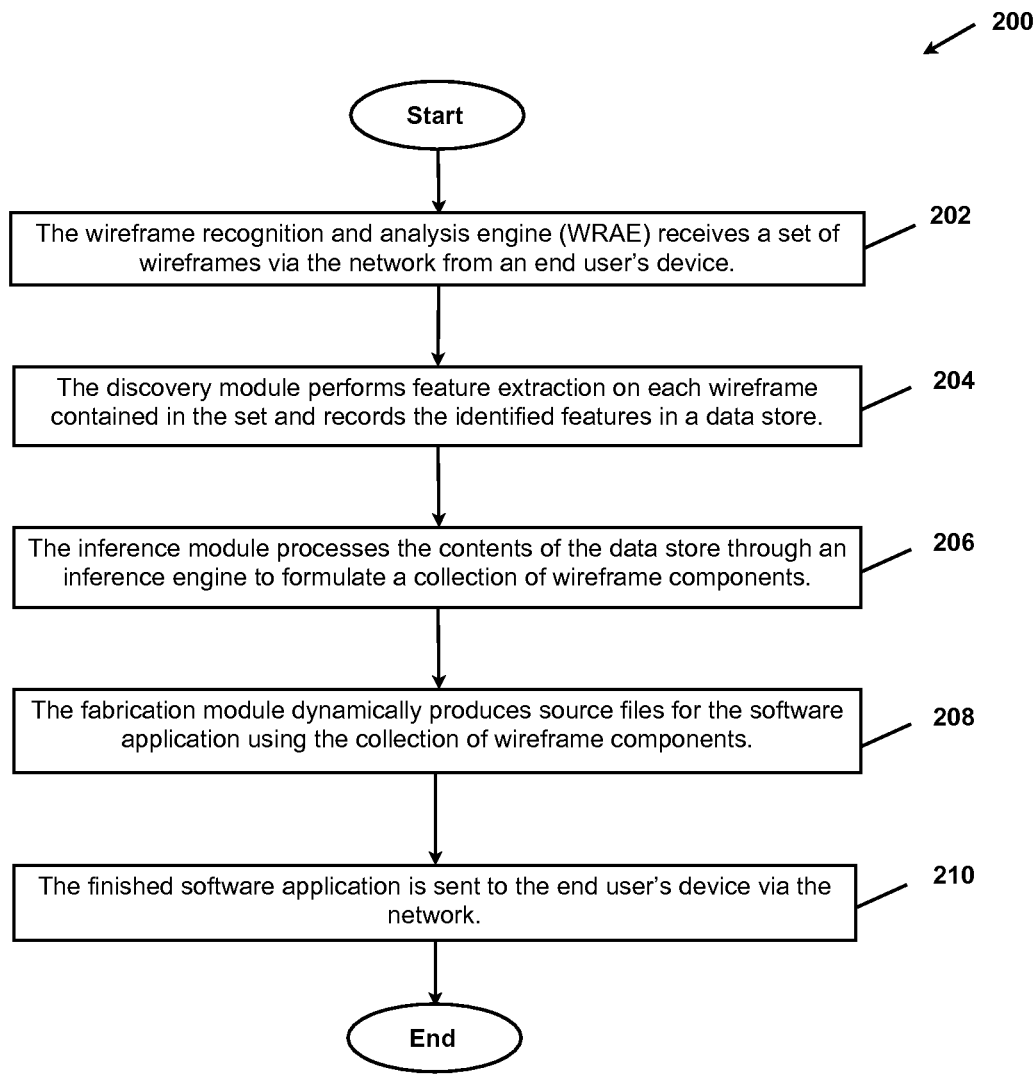
FIG. 2 is a flowchart illustrating a method for dynamically producing source code for a software application from a set of wireframe images, according to one embodiment.

FIG. 2 is a flow chart of a method 200 for dynamically producing source code for a software application from a set of wireframe images, in accordance with embodiments of the present invention. The method 200 begins with the WRAE 108 receiving a set of wireframes via a network from an end user's device 202. The three aforementioned modules 110, 112, 114 of the WRAE 108 are self-contained and each module is executed in the following sequential fashion: first, the discovery module 110 is executed corresponding to step 204, where feature extraction is performed on each wireframe in the input set and the extracted features are stored in the data store 106. Second, the inference module 112 is executed corresponding to step 206, where the collection of wireframe components is formulated. Third, the fabrication module 114 is executed corresponding to step 208, where the software application's source code is dynamically produced using the collection of wireframe components. The output of the fabrication module 114 is the source code for the software application which is delivered to an end users device in step 210 via a network 116.

Figure 3:
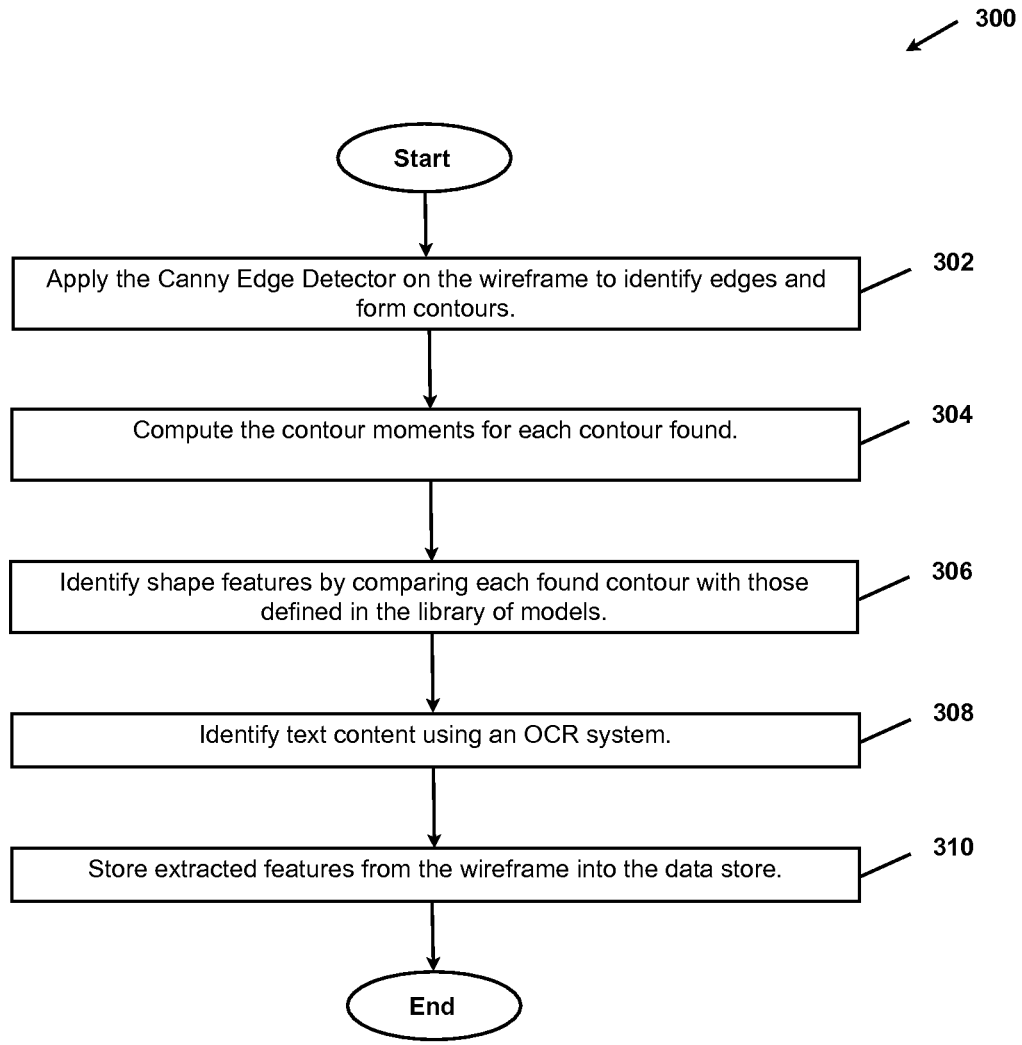
FIG. 3 is a flowchart illustrating a method of feature extraction performed on each wireframe image in an input set, according to one embodiment.

FIG. 3 is a flow chart illustrating a method 300 of feature extraction performed by the discovery module 110 for each wireframe in the input set according to one embodiment. Other embodiments may perform the steps in different orders and may include different and/or additional steps. The discovery module 110 is responsible for identifying and extracting features from the input set of wireframe images. The OpenCV Library (available at http://opencv.willowgarage.com/) is used by the discovery module for all computer vision related needs.

The library of models 102 is pre-populated with data obtained from a training set. Each record in the library of models 102 consists of the name of the shape being described, its computed contour moments, and a serialized contour object representing the shape. Using the library of models 102, the system can be trained to identify common shapes found in wireframe images such as triangles, rectangles, and circles. The placement and arrangement of these features are used in the inference module 112 to recognize structural and user interface wireframe components.

Method 300 corresponds to step 204 in method 200. When the method 300 starts, the data store 106 is empty.

In step 302, the Canny Edge Detector is applied on the wireframe to determine edges and form contours. The Canny algorithm forms contours through the application of hysteresis thresholding. The considered embodiment of the invention, conducts edge detection by passing each input wireframe image through OpenCV's cvCanny( ) function to create an output binary image for each wireframe image in the input set. Each of the output binary images are passed to OpenCV's cvFindContours( ) function, which creates contours from the binary images.

In step 304, the contour moments are computed for each contour found. A common way to describe a contour is by computing its contour moments. The calculated contour moments provide a means to compare contours. The computed contour moments can include the central moments, normalized moments, and rotation invariant moments such as the Hu invariant moments. Each contour found is passed to OpenCV's cvContourMoments( ) function which computes the contour's moments. The central moments can be obtained by using OpenCV's cvGetCentralMoment( ) function. Normalized moments can be obtained by using OpenCV's cvGetNormalizedCentralMoment( ) function. Once the central moments are obtained, they can be passed to OpenCV's cvGetHuMoments( ) function to compute the Hu moments from the central moments.

In step 306, shapes are extracted from the wireframe by comparing each contour's computed moments with those contained in the library of models 102 and finding the best match. This can be accomplished by comparing each found contour with the contours defined in the library of models 102 using OpenCV's cvMatchShapes( ) function. A contour defined in the library of models 102 would first have to be deserialized before performing the matching test using OpenCV's cvMatchShapes( ) function. Upon successfully identifying a shape feature in a wireframe image, an instance, of a shape feature object is instantiated for the shape that is found. The factory design pattern can be utilized by the WRAE system to dynamically instantiate the shape feature object at run-time. The newly instantiated shape feature object is initialized with the screen coordinates, width, and height properties obtained from the matched contour. In addition, the shape feature object's bounding box rectangle property is initialized to the rectangle bounding box bounding the matched contour. OpenCV's cvMinAreaRect2( ) function can be used to find the rectangle that bounds the matched contour. This bounding box rectangle is represented using OpenCV's CVBox2D data type. There may also be other parameters passed to initialize the shape object depending on the shape's type. For example, a circle shape feature object may also have a diameter and origin coordinates parameters passed to initialize a shape feature object representing a circle.

In the event that a shape cannot be matched, an e-mail is generated by the system and sent to the system administrator(s). The e-mail would have the coordinates in the image where the undefined shape is located in the message body and would have an attachment containing the wireframe image with the unidentified shape. The system administrator(s) may then choose to identify the shape, compute its contour moments and add it to the training set by populating it in the library of models 102 resulting in the system being trained to recognize the hitherto unknown shape.

In step 308, text content contained in the wireframe is extracted using an optical character recognition (OCR) system, such as OCRopus (available at http://code.google.com/p/ocropus/). A notable advantage of OCRopus, is that it can be used for line by line text recognition. Each wireframe image is passed through to the OCR system. Upon identifying a line of text, a text feature object is instantiated and initialized with the value of the text found, the screen coordinates for the line of text, and the bounding box property is set to the bounding box bounding the text feature object. The factory design pattern can be utilized by the WRAE system to instantiate the text feature object at run-time.

In step 310, the features extracted from the wireframe are saved to the data store 106. Each feature object that was instantiated and initialized from the identification of shape and text features from the wireframe images, is serialized and saved as a flat file in the data store 106. Each feature object would also contain a property that specified the sheet number that the feature was found on. The value of the sheet number property, begins at 1, and increments by one for each wireframe image in the input set. For example, wireframe image 700, comprising an input set, would have a sheet number property value equal to 1 when input into the system. If another wireframe image had also been included in the input set, it would have been assigned a sheet number property value equal to 2.

Figure 4:
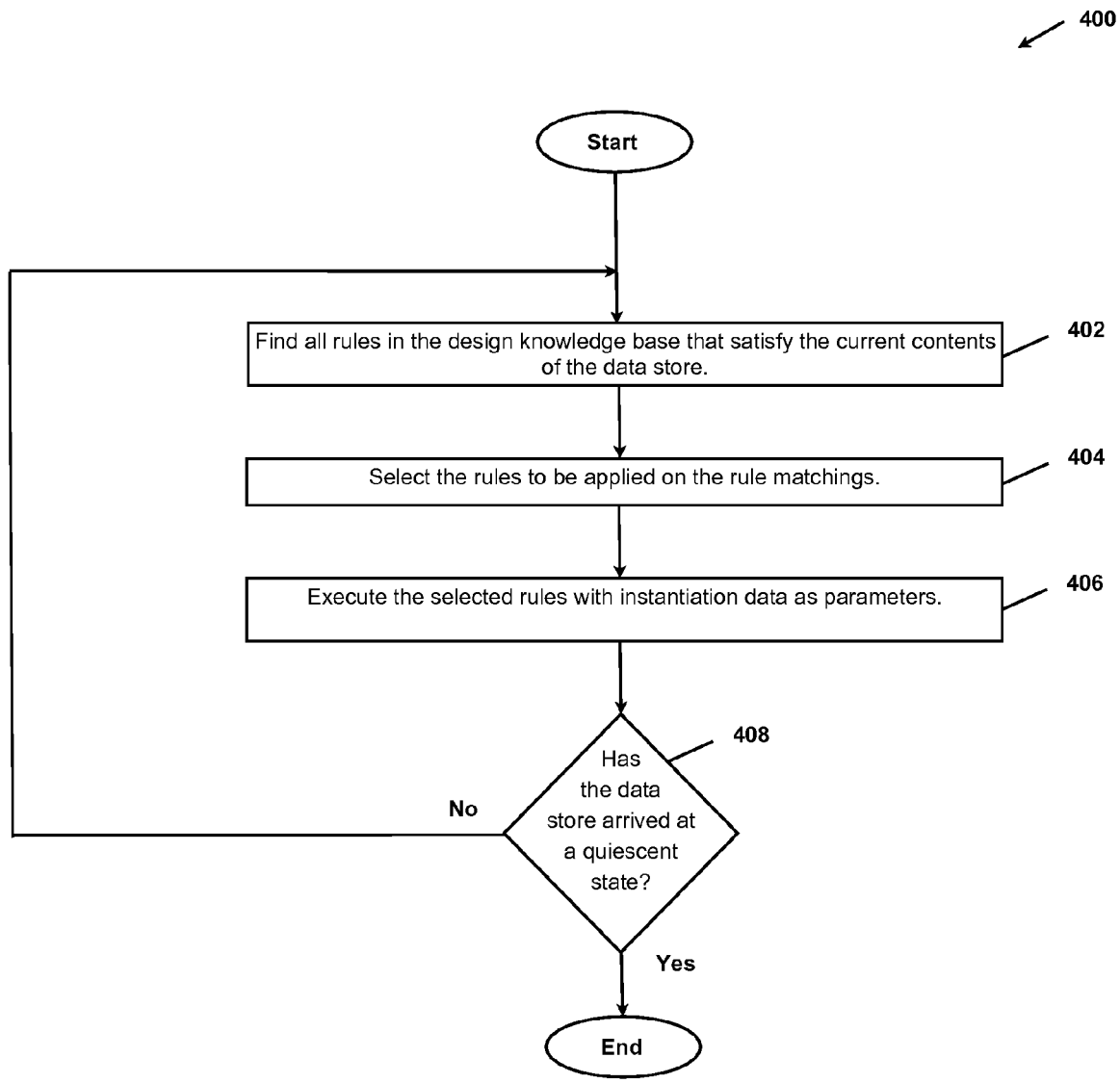
FIG. 4 is a flowchart illustrating a method to formulate a collection of wireframe components from the extracted features found in a set of wireframes, according to one embodiment.

FIG. 4 is a flow chart illustrating a method 400 performed by the inference module to formulate a collection of wireframe components from the features found in a set of wireframes, according to one embodiment. Using the shape and text feature objects populated in the data store 106 by the discovery module, the inference module is responsible for dynamically producing a collection of wireframe component objects that represent the wireframe components that are present in the input set of wireframes.

Method 400 corresponds to step 206 in method 200. Method 400 implements an inference engine that processes the contents of the data store 106 using a knowledge base 104 of wireframe design rules. The knowledge base 104 of wireframe design rules is a repository of rules related to the design of wireframes which provide the WRAE system a means to identify wireframe components from a subset of text and shape feature objects. When method 400 first begins, the data store 106 holds text and shape feature objects populated by the discovery module. Steps 402 to 408 of method 400 comprise the inference engine's recognize-act cycle.

In step 402, all rules in the knowledge base 104 that satisfy the current contents of the data store 106 are found. To identify the wireframe components shown in FIG. 7, the system would match feature objects in the data store 106 to the wireframe design rules defined in the knowledge base 104. FIGS. 11A, 11B, 12A, 12B are examples of wireframe design rules used to recognize wireframe components, according to one embodiment.

Wireframe design rules specify the criteria to identify wireframe components from a subset of text and shape feature objects in the data store 106. These rules are defined in the knowledge base 104 and are stored in condition-action form, where each rule consists of a condition section and an action section. The condition section of a rule specifies a list of conditions that must be met for the rule to be applied. The pair of a rule and a subset of matching items from the data store 106 that match the rule is known as an instantiation of the rule. The action section of a rule specifies the actions that should be taken when all conditions specified in the condition section of the rule have been met. When a rule is executed, the actions specified in the action section of the rule are executed. The subset of matching items from the data store 106 are considered to be instantiation data and are provided as input parameters to a rule when a rule is executed.

The condition section of the wireframe design rules specify how to recognize a wireframe component by testing for the existence of a particular subset of features from the data store 106. In addition, the condition section of a rule also takes into consideration the disposition of a feature to recognize wireframe components. As used herein, the term "disposition of a feature" refers to the placement of the feature and the arrangement of the feature in relation to other features found in the data store 106. The bounding box rectangle that bounds the feature object, and is stored within the feature object's rectangle bounding box property is used to ascertain the disposition of a feature. The placement of a feature can be determined using the screen coordinates of the rectangle bounding box of that feature. The arrangement of the feature in relation to other features can be determined by testing for rectangle containment of the rectangle bounding box of the feature object with the rectangle bounding box of other feature objects in the data store 106. A containment test can be conducted, such as the separating axis test for rectangle containment, to determine if one feature is contained within another feature.

Rules are represented in the WRAE as objects which subclass a base rule object. In the considered embodiment, all rules must implement a testConditions( ) method which represents the condition section of the rule, and an executeActions( ) method, which represents the action section of the rule. Rule objects have a property named "instantiation data" which is an associative array that is empty when the rule object is first initialized by the WRAE system. The base rule object implements a clearInstantiationData( ) method which removes all elements in the rule object's instantiation data property when called. In the considered embodiment of the invention, the knowledge base 104 is a directory on the WRAE server, purposed to store serialized rule objects. The system administrator(s), implement rule objects to represent the wireframe design rules that need to be supported by the WRAE system. The wireframe design rules are defined in the knowledge base 104 by saving the serialized rule objects as flat files in the knowledge base 104 directory.

With regards to the implementation of a rule as a rule object, each condition specified in the condition section of the rule, has a respective if-else conditional construct in the rule object's testConditions( ) method. Should the conditional expression specified in the if portion of the construct evaluate to a boolean value of true, the code specified in the if block of the construct is executed. A shape or text feature object from the data store 106 that matches a condition is designated with a unique identifier, known as a tag name, that has a uniqueness at the rule object level. Populating a feature in a rule object's instantiation data property, which is an associative array, involves adding a new element to the array where the key is set to the tag name of the feature object and the value is set to the full path of the serialized feature object file. After the code specified in the if block of the construct is executed, flow of execution continues to the next condition specified in the testConditions( ) method. In the case, that there are no further conditions to evaluate, the testConditions( ) method returns a boolean value of true. This informs the WRAE system that all conditions specified by the rule object have been satisfied and the rule object's instantiation data property is populated with the subset of features from the data store 106 that satisfy all conditions in the condition section of the rule. In addition, the WRAE system adds the rule object to a queue of rule objects that are to be executed. Should the conditional expression specified in the if portion of the construct evaluate to a boolean value of false, the code specified in the else block of the construct is executed. When this occurs, the rule object's clearinstantiationData( ) method is called, clearing all elements in the rule object's instantiation data property. In addition to this, the testConditions( ) method returns a boolean value of false, which informs the WRAE system that not all conditions specified by the rule object have been satisfied and that the rule object should be discarded. Since the testConditions( ) method will immediately return a boolean value of false upon a failed condition, it is ensured that no subsequent conditions in a rule object's testConditions( ) method are evaluated. Thus, one failed condition in a rule object's testConditions( ) method, disqualifies the rule object from being added to the queue of rule objects to be executed.

The WRAE system deserializes all rule objects from the knowledge base 104 directory, and determines if each rule's conditions are satisfied by calling the rule object's testConditions( ) method in step 402. The examples provided below, demonstrate how the rules are matched to features from the wireframe image 700, through the evaluation of the condition section of the wireframe design rule.

For example, the text label rule, shown in FIG. 11A, has a condition section that specifies how to recognize a text label wireframe component from a subset of matching text and shape feature objects from the data store 106 where each feature object is designated with a tag name. A text feature object, designated as TF1, is immediately contained within a rectangle shape feature object, designated as R1. R1 represents the application window frame 714 shown in FIG. 7. TF1 should not be contained with any other rectangle shape feature object. R1, has the second largest width in the wireframe image, and is contained inside another rectangle shape feature object, R2. R2, has the largest width in the wireframe image, and represents the user interface container 704 shown in FIG. 7. Upon successfully satisfying all conditions specified in the testConditions( ) method, the rule object's instantiation data property, which is an associative array, will contain the following keys: TF1, R1, R2. Each key in the associative array, will be paired to a value, which is the full path to the serialized feature object file in the data store 106 directory for the respective key.

An additional example, the drop down menu rule, shown in FIG. 11B, has a condition section that specifies how to recognize a drop down menu wireframe component from a subset of matching text and shape feature objects from the data store 106 where each feature object is designated with a tag name. A triangle shape feature object, designated as T1, is contained with a rectangle shape feature object, designated as R1. R1 represents the rectangle containing the triangle in FIG. 7. R1 is contained within a rectangle shape feature object, R2. R2's width is at least 7 times greater than that of R1. R1's x-coordinate is at least 1.5 times greater than R2's x-coordinate. A text feature object, TF1, is contained within R2. TF1 represents the default value that the drop down menu is initialized to. In this case, that would be "Select a color". R2 is contained within a rectangle shape feature object, designated as R3. R3, has the second largest width in the wireframe image, and is contained inside another rectangle shape feature object, designated as R4. R3 represents the application window frame 714 shown in FIG. 7. R4 has the largest width in the wireframe image, and represents the user interface container 704 shown in FIG. 7. Upon successfully satisfying all conditions specified in the testConditions( ) method, the rule object's instantiation data property, which is an associative array, will contain the following keys: T1, TF1, R1, R2, R3, R4. Each key in the associative array, will be paired to a value, which is the full path to the serialized feature object file in the data store 106 directory for the respective key.

An additional example, the wireframe annotation marker rule, shown in FIG. 12A, has a condition section that specifies how to recognize a wireframe annotation marker wireframe component from a subset of matching text and shape feature objects from the data store 106 where each feature object is designated with a tag name. A text feature object, designated as TF1, is contained within a circle shape feature object, designated as C1. C1 is contained within a rectangle shape feature object designated as R1. R1, has the second largest width in the wireframe image, and represents the application window frame 714 show in FIG. 7. R1 is contained within a rectangle shape feature object, designated as R2. R2 has the largest width in the wireframe image, and represents the user interface container 704 shown in FIG. 7. Upon successfully satisfying all conditions specified in the testConditions( ) method, the rule object's instantiation data property, which is an associative array, will contain the following keys: TF1, C1 R1, R2. Each key in the associative array, will be paired to a value, which is the full path to the serialized feature object file in the data store 106 directory for the respective key.

An additional example, the wireframe annotation rule, shown in FIG. 12B, has a condition section that specifies how to recognize a wireframe annotation wireframe component from a subset of matching text and shape feature objects from the data store 106 where each feature object is designated with a tag name. A text feature object, designated as TF1, is contained within a rectangle shape feature object designated as R1. R1, represents the wireframe annotation container 706 shown in FIG. 7. R1 contains a text feature object, designated as TF2, that has a text value property of "Wireframe Annotations". TF1's text value property should not be equal to "Wireframe Annotations". Upon successfully satisfying all conditions specified in the testConditions( ) method, the rule object's instantiation data property, which is an associative array, will contain the following keys: TF1, TF2, R1, R2. Each key in the associative array, will be paired to a value, which is the full path to the serialized feature object file in the data store 106 directory for the respective key.

One significant requirement imposed by the WRAE system is that each feature belonging to a subset of features, from the data store 106, that match a wireframe design rule, must all have the same sheet number property value. When more than one wireframe image comprises the input set of wireframe images, this requirement ensures that that wireframe components produced by the inference module are segmented by the sheet number of the wireframe image that the subset of features were found in. This prevents the WRAE system's inference module from erroneously producing wireframe components through the matching of features spread out across multiple wireframe images. Thus, it is implied that when a wireframe design rule is matched to a subset of features in the data store 106, each feature in the subset of features have the same sheet number property value.

In step 404, the rules to be applied on the rule matchings are selected. In the considered embodiment of the invention, the rules to be applied on the rule matchings are simply those rule objects that are in the queue of rule objects to be executed. For example, based off the rule matchings found for the input wireframe image 700 in the previous examples, a rule object representing the text label rule shown in FIG. 11A, a rule object representing the drop down menu rule shown in FIG. 11B, a rule object representing the wireframe annotation marker rule shown in FIG. 12A, and a rule object representing the wireframe annotation rule shown in FIG. 12B would be included in the queue of rule objects to be executed.

In step 406, the selected rules are executed with instantiation data as parameters. This is accomplished by dequeuing each rule object from the queue of rule objects to be executed, and calling each dequeued rule object's executeActions( ) method. The instantiation data for a rule, can be accessed from the instantiation data property, an associative array, of the rule object that represents the rule. For a given feature object, referred to by a tag name in the action section of a rule, the respective path to the serialized object file in the data store 106 directory is accessed from the associative array by using the tag name for the feature object as the key. Using the serialized feature object file, the feature object is deserialized and becomes available for use by the rule object's executeActions( ) method. A rule object's testConditions( ) method is responsible for populating the contents of the rule object's instantiation data property beforehand in step 402. Thus, the instantiation data available to a rule object's executeActions( ) method is dictated by how the rule object's instantiation data property was populated by the testConditions( ) method in step 402.

FIGS. 11A, 11B, 12A are examples of rules that contain an action section that produces wireframe component objects. The action section of these rules specify what type of wireframe component object the system must create, as well as the properties that should be initialized for the newly created wireframe component object. Upon successfully creating and initializing the wireframe component object, the system saves the wireframe component object to the data store 106, which involves serializing the wireframe component object and saving it as a flat file in the data store 106 directory.

For example, the text label rule, shown in FIG. 11A, will instantiate a text label wireframe component object when executed. The instantiation data would comprise of the text feature object, designated as TF1, that was matched in the condition section of the rule. TF1 would be sent as an input parameter to the action section of the text label rule. Upon the execution of the rule, a text label wireframe component object, designated as TL1, will be instantiated with a text value property set to TF1's text value property. TL1 will have its screen coordinate properties set to the screen coordinate properties of TF1. In addition, TL1 will have its width and height properties set to the width and height properties of TF1. Finally, TL1 is serialized and saved to the data store 106.

An additional example, the drop down menu rule, shown in FIG. 11B, will instantiate a drop down menu wireframe component object when executed. The instantiation data would comprise of the subset of extracted features from the data store 106 that matched the condition section of the rule. In this case, that would consist of four rectangle shape feature objects, one triangle shape feature object, and one text feature object. Upon the execution of the rule, a drop down menu wireframe component object, DDM1, will be instantiated having its width and height properties set to the width and height properties of the rectangle shape feature object, R2. DDM1's screen coordinate properties would be set to the screen coordinates of R2. DDM1's default value property would be set to the text value property of the text feature object, TF1. Finally, the DDM1 is serialized and saved to the data store 106.

An additional example, the wireframe annotation marker rule, shown in FIG. 12A, will instantiate a wireframe annotation marker wireframe component object when executed. The instantiation data would comprise of the subset of extracted features from the data store 106 that matched the condition section of the rule. In this case, that would consist of a text feature object, TF1, and a circle shape feature object, C1. Upon the execution of the rule, a wireframe annotation marker object, WAM1, will be instantiated having its width and height properties set to the width and height properties assigned to C1. WAM1's screen coordinate properties will be set to the screen coordinate properties of C1. WAM1's annotation index property will be set to the text value assigned to the text value property of TF1. The annotation index property is a unique identifier which indicates which wireframe annotation applies to the wireframe annotation marker. Finally, WAM1 is serialized and saved to the data store 106.

FIG. 12B is an example of a rule that contains an action section that modifies an existing wireframe component in the data store 106. Modification of a wireframe component in the data store 106 involves the use of a wireframe component handler, which is conceptually analogous to an event handler handling user events. Just as an event handler, executes a predefined set of instructions upon a user event being triggered, a wireframe component handler executes a predefined set of instructions when a wireframe annotation rule is executed. The name of the handler to be applied on a wireframe component object and the arguments that should be passed to the handler are embedded within a wireframe annotation object's text value property.

For example, the wireframe annotation rule, shown in FIG. 12B, will apply changes to an existing wireframe component object that is referenced by a wireframe annotation marker when executed. The instantiation data would comprise of the subset of extracted features from the data store 106 that matched the condition section of the rule. Instantiation data is accessed using the rule object's instantiation data property. In this case, that would consist of two text feature objects and a rectangle feature object. Upon the execution of the rule, the text value property of TF1 is parsed to retrieve the annotation reference index, which will be used to identify the respective wireframe annotation marker object, WAM1. A search is conducted through the data store 106 to find the wireframe component object, WCO1, that is closest to WAM1. This search is performed by iterating through all wireframe component objects in the data store 106 and calculating the distance for each wireframe component object's screen coordinates to those screen coordinates assigned to WAM1. The appropriate handler to apply on WCO1 is determined by parsing the text value property of TF1. By splitting TF1's text value property using the colon character as a delimiter, the name of the handler is ascertained to be "Drop Down Menu List" and the arguments passed to the handler are ascertained to be "Blue, Green, Orange, Red, Yellow". The "Drop Down Menu List" is a wireframe component handler that is used to populate a drop down menu object's key list property, an array, with the arguments provided to the handler. Finally, the handler is applied to WCO1 with the arguments resulting in the drop down menu object's key list property being populated with the list of values specified in the wireframe annotation.

The method includes determining, in step 408, whether the data store 106 has arrived at a quiescent state. If the data store 106 has not arrived at a quiescent state, the method returns to step 402. If the data store 106 has arrived at a quiescent state, the method ends.

In the considered embodiment of the invention, once the queue of rule objects to be executed is empty, the data store 106 has arrived at a quiescent state. Once the quiescent state is reached, the list of wireframe components that exist in the data store 106 are considered to be the collection of wireframe components that are used as input to the fabrication module. Other embodiments of the invention may use different criteria for specifying when the data store 106 has reached a quiescent state.

Figure 5:
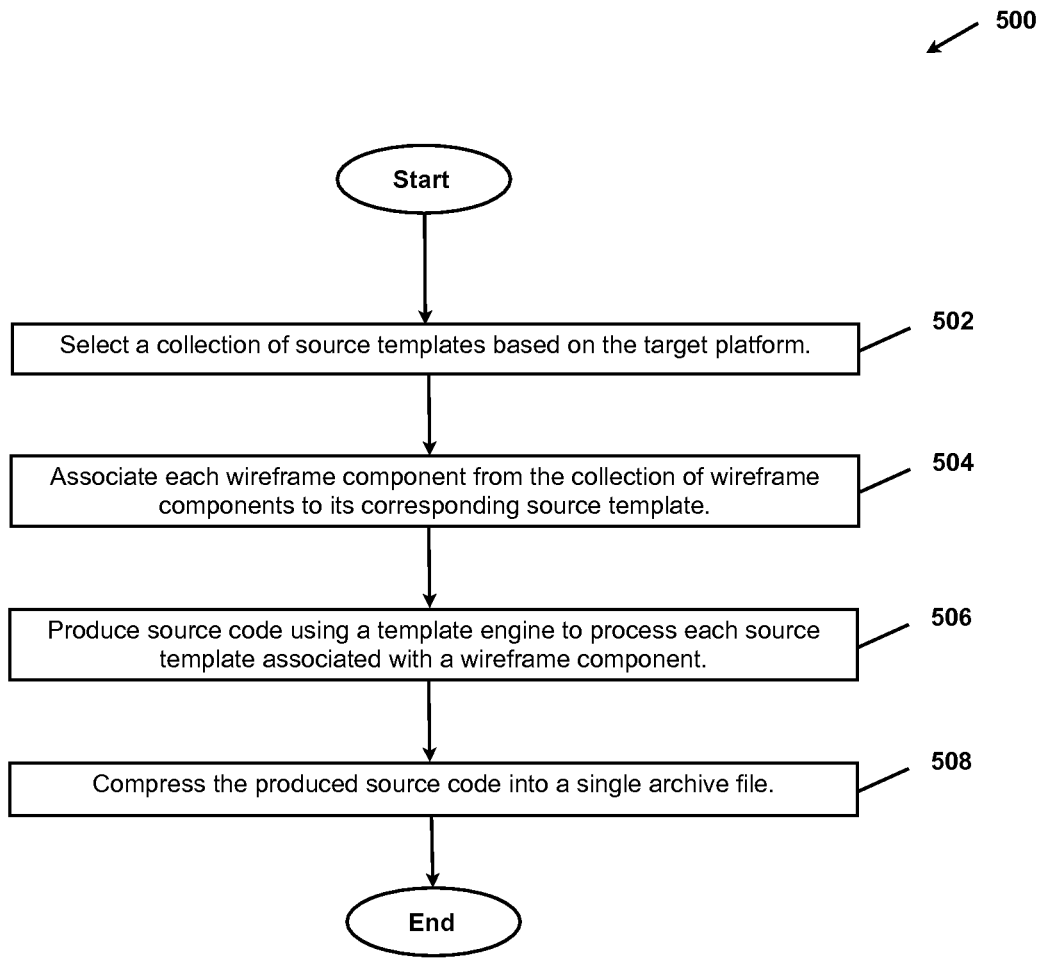
FIG. 5 is a flowchart illustrating a method to fabricate a software application from a collection of wireframe components, according to one embodiment.

FIG. 5 is a flow chart illustrating a method 500 performed by the fabrication module to dynamically produce source code from a collection of wireframe components. Method 500 corresponds to step 208 in method 200.

In step 502, a set of source templates is selected based on the target platform. Source templates are platform-specific, as the code that is specified within them is used to generate source code for a particular target platform. The value for the target platform is obtained from the user-configured option specifying the target platform. For example, all source templates may be stored at the following path:/wrae_templates. Source templates for a desktop Mac OS X version 10.7 application may reside at the following path:/wrae_templates/mac-os-x_v10.7. Source templates for an iOS version 6 application for an iPhone may reside at the following path:/wrae_templates/iphone-ios_v6. The user-configured option specifying the target platform determines which source template directory to use for generating source code.

FIG. 8 is an example of a source template implemented in the PHP language as a shell script. The file name for the source template is "DropDownMenuTemplate" (since it is an executable PHP shell script, it doesn't require a ".php" extension). This source template produces source code in the Objective-C language for a drop down menu to be used in a Mac OS X desktop application. The path to a serialized wireframe component object file is provided as a command line argument to the "DropDownMenuTemplate" shell script. The source template deserializes the serialized wireframe component object file's contents, and the wireframe component object's properties are used in conjunction with the code specified in the source template to produce Objective-C source code for a drop down menu when processed through a template engine. In the considered embodiment of the invention, the PHP interpreter's built-in template engine is used for processing the source template.

In step 504, each wireframe component from the collection of wireframe components is associated to its corresponding source template. Each wireframe component that exists in the data store 106 is deserialized and the wireframe's classname is obtained. The source template to be used on a particular wireframe component is derived from the class name of the wireframe component appended with the string "Template". For example, if the class name of the wireframe component was "DropDownMenu", the associated source template's file name would be "DropDownMenuTemplate". A validation is performed to verify that the source template file exists and that it is an executable file. If the source template file exists and the file is executable, the wireframe component is associated with the source template file. If these conditions are not met, the wireframe component is discarded.

FIG. 9A is an exemplary class declaration for a wireframe component object implemented in the PHP language with the file name "WireframeComponent.php", according to one embodiment.

FIG. 9B is an exemplary class declaration for a drop down menu wireframe component object implemented in the PHP language with the file name of "DropDownMenu.php", according to one embodiment. In the considered embodiment, the drop down menu class is a subclass of the wireframe component class shown in FIG. 9A.

FIG. 9C is an example of a serialized drop down menu wireframe component object that exists in the data store 106.

In step 506, source code is produced using a template engine to process each source template associated with a wireframe component. In the considered embodiment, PHP's built-in template engine is used to process the code specified in the template in conjunction with the source template's associated serialized wireframe component.

For example, this can be performed by simply executing the DropDownMenuTemplate shell script shown in FIG. 8 with a command line argument specifying the path to the serialized wireframe component file shown in FIG. 9C. Each source template associated with a wireframe component is executed and the output is redirected to a uniquely named file located in the source code output directory for the current job id. FIG. 11 is the exemplary output, according to one embodiment, after processing the code specified in the source template shown in FIG. 8 through a template engine in conjunction with the serialized wireframe component object shown in FIG. 9C.

In step 508, the produced source code is compressed into a single archive file. In the considered embodiment, this step can be implemented using the tar command with the "czf" flags to create a gzipped Unix tarball file (.tgz file extension) on the output source code directory for the current job id. In other embodiments, it is possible that the compressed file may be created using a different archive file format such as PK Zip.

Finally, the WRAE can send a notification to the end user's device that the software application has been generated. In the considered embodiment, the archive file containing the source code for the software application can be transmitted using a persistent TCP/IP connection that had been established when the end user's device first connected to the WRAE server.

The WRAE system is designed such that wireframe components are agnostic to a target platform, but source templates are platform-specific. This allows the WRAE system to be extensible. When a new platform needs to be supported, one simply needs to implement a set of source templates for the platform that needs to be supported, ensuring that a source template would be implemented for each type of wireframe component that needs to be supported by the WRAE system.

Figure 6:
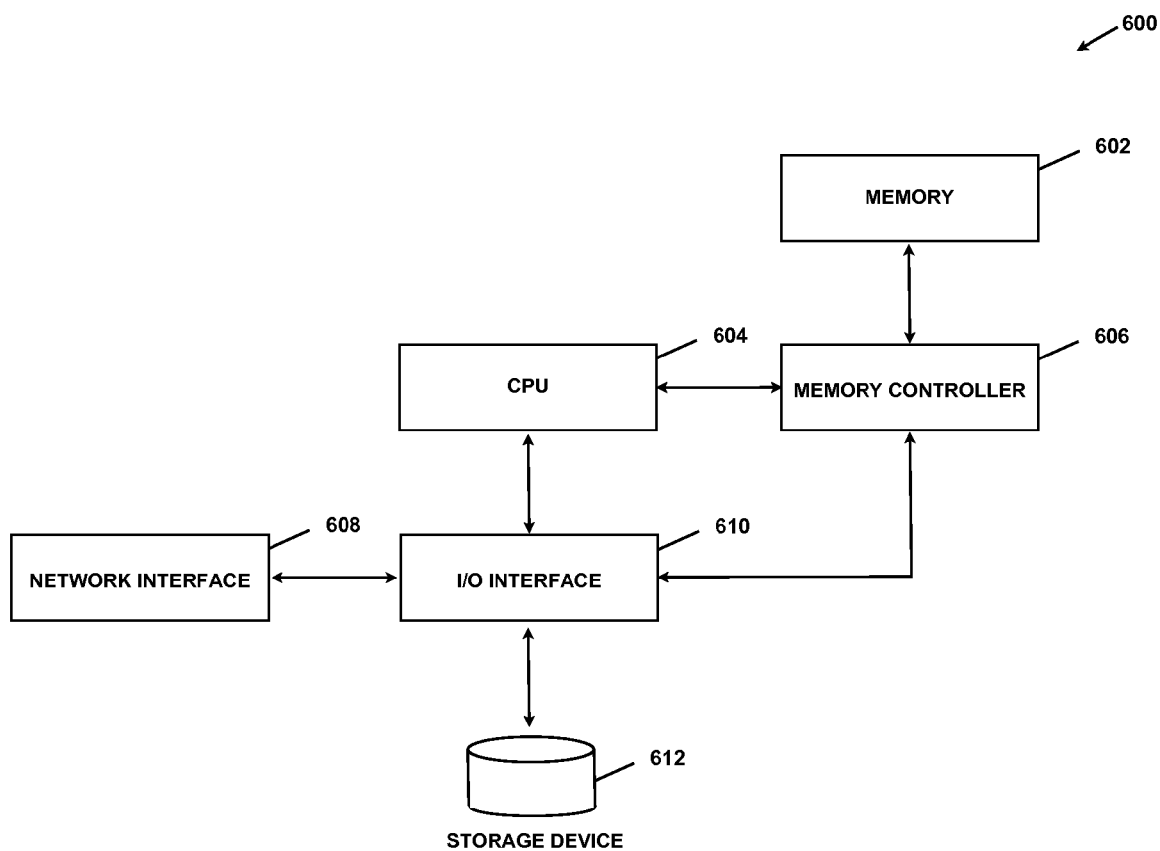
FIG. 6 is a high-level block diagram illustrating an example of a computing system for use as a wireframe recognition and analysis engine (WRAE) server, according to one embodiment.

FIG. 6 is a high-level block diagram illustrating an example of a computer 600 for use as a WRAE server 108 and implements the method illustrated in FIG. 2, in accordance with embodiments of the present invention. The computer comprises a memory 602, at least one central processing unit (CPU) 604, a memory controller 606, a network interface 608, an I/O (input/output) interface 610, and a storage device 612. In one embodiment, the executable computer program instructions implementing the method illustrated in FIG. 2 are stored on the storage device, loaded into memory, and executed by the CPU.

The I/O interface 610 exchanges information to or from devices, which can be either internal or external to the computer 600. The I/O interface 610 allows the computer 600 to retrieve and store program instructions and data, from a storage device 612. The storage device 612 comprises one or more non-transitory computer-readable storage media such as a magnetic disk drive, optical disk drive (e.g. CD-ROM, DVD), or a solid-state memory device.

The memory controller 606 directs the flow of data going to and from memory 602. Memory 602 contains instructions and data used by the CPU 604 to implement the steps of the method illustrated in FIG. 2. In addition, memory 602 can include other systems, not shown, such as the operating system (e.g. Mac OS X) that runs on the CPU 604. The computer 600 is connected to a network through a network interface 608. Other embodiments of the computer 600 have different and/or other components than those shown in FIG. 6. For example, the computer 600 can include a display device, keyboard, mouse, and other components.

Embodiments of the present invention have been described herein for the purpose of illustration, of which there may exist many variations that will be apparent to those skilled in the art, and would be encompassed by the spirit and scope of the present invention. The scope of the present invention is to be limited only by the accompanying claims.

The invention claimed is:

1. A computer-implemented method for dynamically producing source code for a software application from a set of wireframe images, comprising:
   defining a plurality of shapes common to wireframe images in a library of models;
   defining a plurality of wireframe design rules in a knowledge base;
   receiving, from an end user's device, a set of wireframe images depicting the software application to be fabricated and a set of user-configured options;
   extracting the plurality of features contained in each wireframe image in the set;
      wherein extracting the plurality of features contained in each wireframe in the set, comprises:
      processing each wireframe image in the set of wireframe images through an edge detector to identify edges and form contours;
      computing a set of contour moments of the formed contours from each wireframe image in the set;
      matching the set of computed contour moments of each formed contour with those defined in the library of models to identify shape features;
      performing optical character recognition on each wireframe image in the set of wireframe images to identify text features;
      storing the identified features from each wireframe image in the set of wireframe images to a data store;
   formulating a collection of wireframe components from the plurality of extracted features;
   generating the source code for the software application from the collection of wireframe components;
      where in generating comprises:
      selecting a set of source templates based on the user-configured option that specifies the target platform;
      associating each wireframe component from the collection of wireframe components to its corresponding source template;
      producing source code using a template engine to process each source template associated with a wireframe component; and
   providing to the end user's device, an archive file containing the source code for the software application.

2. The computer-implemented method of claim 1, wherein each shape definition in the plurality of shapes defined in the library of models, comprises defining a set of contour moments for the contour that represents the shape in the library of models.

3. The computer-implemented method of claim 1, wherein each wireframe design rule definition in the plurality of wireframe design rules defined in the knowledge base, comprises defining a wireframe component based on a set of features along with the disposition of each feature in the set of features.

4. The computer-implemented method of claim 1, wherein the set of user-configured options received from the end user's device, includes a user-configured option to specify the target platform of the software application to be fabricated.

5. The computer-implemented method of claim 1, wherein formulating the collection of wireframe components from the plurality of extracted features, comprises processing the contents of the data store through an inference engine that utilizes the knowledge base containing the plurality of wireframe design rules;
   producing wireframe components during the execution state of the inference engine's recognize-act cycle;
   storing the produced wireframe components to the data store; collecting all wireframe components that exist in the data store once the contents of the data store have arrived at a quiescent state.

6. The computer-implemented method of claim 1, wherein generating the source code for the software application from the collection of wireframe components, comprises
   compressing the produced source code into a single archive file.

7. A non-transitory computer-readable storage medium storing executable computer program instructions that constitute a service, when executed by a computer, cause the computer to perform operations comprising:
   defining a plurality of shapes common to wireframe images in a library of models;
   defining a plurality of wireframe design rules in a knowledge base;
   receiving, from an end user's device, a set of wireframe images depicting the software application to be fabricated and a set of user-configured options;
   extracting the plurality of features contained in each wireframe image in the set;
      wherein extracting the plurality of features contained in each wireframe in the set, comprises:
      processing each wireframe image in the set of wireframe images through an edge detector to identify edges and form contours;
      computing a set of contour moments of the formed contours from each wireframe image in the set;
      matching the set of computed contour moments of each formed contour with those defined in the library of models to identify shape features;
      performing optical character recognition on each wireframe image in the set of wireframe images to identify text features;
      storing the identified features from each wireframe image in the set of wireframe images to a data store;
   formulating the collection of wireframe components from the plurality of extracted features;
   generating the source code for the software application from the collection of wireframe components;
      where in generating comprises:
      selecting a set of source templates based on the user-configured option that specifies the target platform;
      associating each wireframe component from the collection of wireframe components to its corresponding source template;
      producing source code using a template engine to process each source template associated with a wireframe component; and
   providing to the end user's device, an archive file containing the source code for the software application.

8. A computer system comprising: memory; input/output (I/O) device;
   at least one non-transitory computer-readable storage medium storing executable computer program instructions comprising instructions for:
   defining a plurality of shapes common to wireframe images in a library of models;
   defining a plurality of wireframe design rules in a knowledge base;

receiving, from an end user's device via the input/output (I/O) device, a set of wireframe images depicting the software application to be fabricated and a set of user-configured options;

extracting the plurality of features contained in each wireframe image in the set;

wherein extracting the plurality of features contained in each wireframe in the set, comprises:

processing each wireframe image in the set of wireframe images through an edge detector to identify edges and form contours;

computing a set of contour moments of the formed contours from each wireframe image in the set;

matching the set of computed contour moments of each formed contour with those defined in the library of models to identify shape features;

performing optical character recognition on each wireframe image in the set of wireframe images to identify text features;

storing the identified features from each wireframe image in the set of wireframe images to a data store;

formulating the collection of wireframe components from the plurality of extracted features;

generating the source code for the software application from the collection of wireframe components;

where in generating comprises:

selecting a set of source templates based on the user-configured option that specifies the target platform;

associating each wireframe component from the collection of wireframe components to its corresponding source template;

producing source code using a template engine to process each source template associated with a wireframe component;

providing to the end user's device, via the input/output (I/O) device, an archive file containing the source code for the software application; and at least one CPU for executing the computer program instructions.

* * * * *